US010503704B2

(12) United States Patent
Narasayya et al.

(10) Patent No.: US 10,503,704 B2
(45) Date of Patent: Dec. 10, 2019

(54) ISOLATING RESOURCES AND PERFORMANCE IN A DATABASE MANAGEMENT SYSTEM

(71) Applicant: Microsoft Technology Licensing, LLC, Redmond, WA (US)

(72) Inventors: Vivek R. Narasayya, Redmond, WA (US); Sudipto Das, Redmond, WA (US); Feng Li, Singapore (SG); Manoj A. Syamala, Issaquah, WA (US); Hyunjung Park, Sunnyvale, CA (US); Surajit Chaudhuri, Redmond, WA (US); Badrish Chandramouli, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 15/252,972

(22) Filed: Aug. 31, 2016

(65) Prior Publication Data
US 2016/0371307 A1 Dec. 22, 2016

Related U.S. Application Data

(63) Continuation of application No. 13/747,686, filed on Jan. 23, 2013, now Pat. No. 9,477,710.

(51) Int. Cl.
*G06F 16/00* (2019.01)
*G06F 16/21* (2019.01)
(Continued)

(52) U.S. Cl.
CPC ............ *G06F 16/21* (2019.01); *G06F 11/302* (2013.01); *G06F 11/3409* (2013.01);
(Continued)

(58) Field of Classification Search
CPC ............ G06F 17/30289; G06F 11/302; G06F 11/3409; G06F 11/3442; G06F 11/3495;
(Continued)

(56) References Cited

U.S. PATENT DOCUMENTS 5,586,219 A * 12/1996 Yufik ................... G06N 3/0472
706/14
7,028,158 B1 4/2006 Beatty et al.
(Continued)

FOREIGN PATENT DOCUMENTS

WO 2014206266 A1 12/2014

OTHER PUBLICATIONS

Armbrust, et al., "PIQL: Success-Tolerant Query Processing in the Cloud", Proceedings of the VLDB Endowment, vol. 5, Issue 3, Nov. 2011, pp. 181-192.
(Continued)

*Primary Examiner* — Noosha Arjomandi
(74) *Attorney, Agent, or Firm* — Workman Nydegger (57) ABSTRACT

Techniques for tenant performance isolation in a multiple-tenant database management system are described. These techniques may include providing a reservation of server resources. The server resources reservation may include a reservation of a central processing unit (CPU), a reservation of Input/Ouput throughput, and/or a reservation of buffer pool memory or working memory. The techniques may also include a metering mechanism that determines whether the resource reservation is satisfied. The metering mechanism may be independent of an actual resource allocation mechanism associated with the server resource reservation.

20 Claims, 6 Drawing Sheets

(51) Int. Cl.
G06F 16/23 (2019.01)
G06F 16/2455 (2019.01)
G06F 11/34 (2006.01)
G06F 11/30 (2006.01)

(52) U.S. Cl.
CPC ...... *G06F 11/3442* (2013.01); *G06F 11/3495* (2013.01); *G06F 16/217* (2019.01); *G06F 16/2379* (2019.01); *G06F 16/24561* (2019.01); *G06F 11/3485* (2013.01); *G06F 2201/80* (2013.01); *G06F 2201/815* (2013.01)

(58) Field of Classification Search
CPC ......... G06F 17/30306; G06F 17/30377; G06F 17/30501; G06F 11/3485; G06F 2201/80; G06F 2201/815; G06F 17/30327; G06F 17/3053; G06F 17/30625; G06F 17/30961; G06F 16/2365; G06F 11/3452; G06F 11/34; G06F 16/24561; G06F 16/2379; G06F 16/217; G06F 16/21
See application file for complete search history.

(56) References Cited

U.S. PATENT DOCUMENTS

| | | | |
|---|---|---|---|
| 7,640,547 B2 | 12/2009 | Neiman et al. | |
| 8,346,747 B2* | 1/2013 | Liu | G06F 17/30575 707/705 |
| 8,386,540 B1 | 2/2013 | McAlister et al. | |
| 8,589,549 B1 | 11/2013 | Vermeulen et al. | |
| 9,317,680 B2* | 4/2016 | Carter, III | G06F 21/51 |
| 9,477,710 B2 | 10/2016 | Narasayya et al. | |
| 9,602,426 B2* | 3/2017 | Das | H04L 47/72 |
| 2007/0226449 A1* | 9/2007 | Akimoto | G06F 9/5077 711/170 |
| 2008/0270459 A1* | 10/2008 | Grewal | G06F 17/30566 |
| 2009/0182605 A1 | 7/2009 | Lappas et al. | |
| 2009/0327781 A1 | 12/2009 | Tripathi | |
| 2010/0083248 A1 | 4/2010 | Wood et al. | |
| 2010/0278135 A1* | 11/2010 | Inaida | H04L 5/0007 370/329 |
| 2011/0119312 A1 | 5/2011 | Chopra et al. | |
| 2011/0225017 A1* | 9/2011 | Radhakrishnan | G06Q 10/06315 705/7.25 |
| 2011/0252421 A1* | 10/2011 | Vega | G06F 9/5027 718/1 |
| 2012/0066020 A1 | 3/2012 | Moon et al. | |
| 2012/0102481 A1* | 4/2012 | Mani | G06F 11/0757 717/172 |
| 2012/0117242 A1 | 5/2012 | Aoki et al. | |
| 2012/0131591 A1 | 5/2012 | Moorthi et al. | |
| 2012/0173513 A1 | 7/2012 | Agrawal et al. | |
| 2012/0215918 A1* | 8/2012 | Vasters | H04L 67/02 709/226 |
| 2012/0265741 A1* | 10/2012 | Moon | G06F 9/5083 707/694 |
| 2013/0007753 A1 | 1/2013 | Jain | |
| 2013/0086273 A1 | 4/2013 | Wray et al. | |
| 2013/0124807 A1* | 5/2013 | Nielsen | G06F 11/1438 711/162 |
| 2013/0179476 A1 | 7/2013 | Saam et al. | |
| 2013/0191523 A1* | 7/2013 | Buck | G06F 9/5066 709/223 |
| 2013/0238641 A1* | 9/2013 | Mandelstein | G06F 16/211 707/756 |
| 2013/0254384 A1 | 9/2013 | Wray | |
| 2013/0297655 A1* | 11/2013 | Narasayya | G06F 17/30575 707/791 |
| 2013/0326064 A1* | 12/2013 | Gulati | G06F 9/5061 709/226 |
| 2013/0346533 A1* | 12/2013 | Agrawal | H04L 29/0854 709/213 |
| 2014/0040999 A1* | 2/2014 | Zhang | G06F 21/31 726/5 |
| 2014/0068611 A1 | 3/2014 | Mcgrath et al. | |
| 2014/0068699 A1* | 3/2014 | Balacheff | H04L 41/5045 726/1 |
| 2014/0207740 A1 | 7/2014 | Narasayya et al. | |
| 2014/0215487 A1 | 7/2014 | Cherkasova et al. | |
| 2014/0324647 A1* | 10/2014 | Iyoob | G06Q 40/12 705/30 |
| 2014/0379924 A1 | 12/2014 | Das et al. | |
| 2015/0281111 A1 | 10/2015 | Carl | |
| 2016/0103717 A1 | 4/2016 | Dettori et al. | |
| 2016/0274940 A1* | 9/2016 | Birdsall | G06F 9/505 |
| 2016/0321588 A1* | 11/2016 | Das | G06Q 10/06315 |
| 2017/0005515 A1* | 1/2017 | Sanders | H02J 3/381 |
| 2018/0314616 A1* | 11/2018 | Savolainen | G06F 9/50 |

OTHER PUBLICATIONS

Bobrowski, Steve, "Optimal Multitenant Designs for Cloud Apps", IEEE 4th International Conference on Cloud Computing, Jul. 4, 2011, 6 pages.

Chi, et al., "iCBS: Incremental Cost-based Scheduling Under Piecewise Linear SLAs", Proceedings of the VLDB Endowment, vol. 4, Issue 9, Jun. 2011, pp. 563-574.

Curino, et al., "Workload-Aware Database Monitoring and Consolidation", ACM SIGMOD International Conference on Management of Data, Jun. 12, 2011, 12 pages.

"Dell DVD Store Database Test Suite: The DVD Store Version 2 (DS2), v2.1", http://linux.dell.com/dvdstore, retrieved Jan. 29, 2013, 1 page.

Elmore, et al., "Towards an Elastic and Autonomic Multitenant Database", 6th International Workshop on Networking Meets Databases, Jun. 12, 2011, 6 pages.

Gao, et al., "Develop and Deploy Multi-Tenant Web-delivered Solutions using IBM Middleware: Part 3: Resource Sharing, Isolation and Customization in the Single Instance Multi-tenant Application", retrieved Jan. 29, 2013 from http://www.ibm.com/developerworks/webservices/library/ws-multitenant/index.html, Mar. 11, 2009, 6 pages.

Gulati, et al., "mClock: Handling Throughput Variability for Hypervisor IO Scheduling", 9th USENIX Symposium on Operating Systems Design and Implementation, Oct. 4, 2010, 15 pages.

Krompass et al, "Quality of Service Enabled Management of Database Workloads", IEEE Database Engineering Bulletin, vol. 31, No. 1, Mar. 2008, 8 pgs.

Lang, et al., "Towards Multi-Tenant Performance SLOs", IEEE 28th International Conference on Data Engineering, Apr. 1, 2012, 12 pages.

Mercer, "Processor Capacity Reserves: Operating System Support for Multimedia Applications", Proc of Intl Conf on Multimedia Computing and Systems, May 1994, 10 pages.

Narasayya, "SQLVM: Performance Isolation in Multi-Tenant Relational Database-as-a-Service", In 6th Biennial Conference on Innovative Data Systems Research, Jan. 6, 2013, 9 pages.

Office Action for IDS Purposes U.S. Appl. No. 13/747,686, dated Jan. 23, 2015, Narasayya et al., "Isolating Resources and Performance in a Database Management System", 15 pages.

Office action for U.S. Appl. No. 13/747,686, dated Jan. 25, 2016, Narasaya et al., "Isolating Resources and Performance in a Database Management System", 13 pages.

Office action for U.S. Appl. No. 13/747,686, dated Jun. 18, 2015, Inventor #1, "Isolating Resources and Performance in a Database Management System", 17 pages.

"Resource Governor", Microsoft SQL Server, 2012, retrieved Jan. 10, 2013 from http://msdn.microsoft.com/en-us/library/bb933866.aspx, 4 pgs.

Shue, et al., "Performance Isolation and Fairness for Multi-Tenant Cloud Storage", 10th USENIX Symposium on Operating Systems Design and Implementation (OSDI '12), Oct. 8, 2012, 14 pages.

Smith et al, "Scheduling with Advanced Reservations", Proc of 14th Intl Parallel and Distributed Processing Symposium, May 2000, 6 pgs.

(56) References Cited

OTHER PUBLICATIONS

Stonebraker, Michael, "Operating System Support for Database Management", In Communications of the ACM, vol. 24, Issue 7, Jul. 1981, 7 pages.
Surtani, Manik, "Data-as-a-Service: The Data Fabric for Clouds", Dzone, May 19, 2010, 4 pages.
"Transaction Processing Performance Council, TPC-C Benchmark", http://www.tpc.org/tpcc, Jan. 29, 2013, 2 pages.
"Transaction Processing Performance Council, TPC-H Benchmark", http://www.tpc.org/tpch, retrieved on Jan. 30, 2012, 2 pages.
Urgaonkar, et al., "Resource Overbooking and Application Profiling in Shared Hosting Platforms", In Proceedings of 5th Symposium on Operating Systems Design and Implementation, vol. 36, Dec. 9, 2002, 15 pages.
Wilkins, Mark, "Oracle Reference Architecture—Cloud Foundation Architecture", White Paper of Oracle, Nov. 2011, 60 pages.
Xiong, et al., "Intelligent Management of Virtualized Resources for Database Systems in Cloud Environment", In Proceedings of the IEEE 27th International Conference on Data Engineering, Apr. 11, 2011, pp. 87-98.
"Amazon CloudWatch", Retrieved From: http://docs.aws.amazon.com/AmazonCloudWatch/latest/DeveloperGuide/acw-dg.pdf, 2018, 368 Pages.
"An Oracle White Paper: Delivering Database As a Service (DBaaS) Using Oracle Enterprise Manager 12c", Retrieved From: http://web.archive.org/web/20150319064703/http://www.oracle.com/technetwork/oem/cloud-mgmt/dbaas-overview-wp-1915651.pdf, Oct. 2013, 21 Pages.
"Auto Scaling", Retrieved From: https://web.archive.org/web/20150204025146/http://aws.amazon.com/autoscaling/, Retrieved on: Feb. 10, 2015, 3 Pages.
"Autoscaling Groups Of Instances", Retrieved From: http://web.archive.org/web/20160406103155/https:/cloud.google.com/compute/docs/autoscaler/, Retrieved on: Feb. 10, 2015, 7 pages.
"AWS: Amazon DynamoDB FAQs", Retrieved from: http://web.archive.org/web/20150407205632/https://aws.amazon.com/dynamodb/faqs/, Retrieved On: Apr. 7, 2015, 40 Pages.
"Introduction to Amazon Web Services", Retrieved From: http://salsahpc.indiana.edu/ICPAD/slides/Amazon_Web_Services_final.pdf, Retrieved On: Jul. 26, 2018, 47 Pages.
"Postgres Plus Cloud Database", Retrieved From: http://get.enterprisedb.com/docs/Postgres_Plus_Cloud_Database_Getting_Started_Guide_20140121.pdf, Jan. 6, 2014, 99 Pages.
"VMware Delivers A Modern Approach To Data Management High-Speed Data, Elastic Scale And Database-As-A-Service Capabilities For The Cloud Era", Retrieved From: https://web.archive.org/web/20130201125804/http://www.vmware.com/files/pdf/vFabric_Solutions_brief.pdf, Retrieved on: Feb. 1, 2013, 6 Pages.
"Final Office Action Issued in U.S. Appl. No. 14/702,644", dated Feb. 14, 2018, 19 Pages. (MS#356733-US-NP).
"Non Final Office Action Issued in U.S. Appl. No. 14/702,644", dated Jul. 31, 2018, 17 Pages. (MS#356733-US-NP).
"Non-Final Office Action Issued in U.S. Appl. No. 14/702,644", dated Aug. 8, 2017, 19 Pages.(MS#356733-US-NP).
Ahmad, et al., "Predicting Completion Times Of Balch Query Workloads Using Interaction-Aware Models And Simulation", In Proceedings of 14th International Conference on Extending Database Technology, Mar. 21, 2011, pp. 449-460.
Akdere, et al., "Learning-Based Query Performance Modeling And Prediction", In Proceedings of the IEEE 28th International Conference on Data Engineering, Apr. 1, 2012, pp. 390-401.
Arredondo, J. R.., "Rackspace Cloud Databases And Container-Based virtualization", Retrieved From: http://c1776742.cdn.cloudfiles.rackspacecloud.com/downloads/pdfs/Rackspace-Cloud-Databases-and-Container-based-Virtualization.pdf, Aug. 2012, 6 Pages.
Barker, et al., "ShuttleDB: Database-Aware Elasticity In The Cloud", In Proceedings of 11th International Conference on Autonomic Computing, Jun. 18, 2014, pp. 1-11.

Curino, et al., "Relational Cloud: A Database-as-a-Service for the Cloud", In Proceedings of 5th Biennial Conference on Innovative Data Systems Research, Jan. 18, 2011, pp. 1-7.
Das, et al., "EiasTraS: An Elastic, Scalable, And Self-Managing Transactional Database For The Cloud", In Journal of ACM Transactions on Database Systems, vol. 38, Issue 1, Apr. 1, 2013, 45 pages.
Didona, et al., "Transactional Auto Scaler: Elastic Scaling Of In-Memory Transactional Data Grids", In Proceedings of 9th ACM International Conference on Autonomic Computing, Sep. 18, 2012, 10 pages.
Duggan, et al., "Performance Prediction For Concurrent Database Workloads", In Proceedings of the ACM SIGMOD International Conference on Management of data, Jun. 12, 2011, pp. 337-348.
Elmore, et al., "Characterizing Tenant Behavior For Placement And Crisis Mitigation In Multitenant DBMSs", In Proceedings of the ACM SIGMOD International Conference on Management of Data, Jun. 22, 2013, pp. 517-528.
Ganapathi, et al., "Predicting Multiple Metrics For Queries: Better Decisions Enabled By Machine Learning", In Proceedings of IEEE 25th International Conference on Data Engineering, Mar. 29, 2009, 12 Pages.
Gandhi, et al., "AutoScale: Dynamic, Robust Capacity Management For Multi-Tier Data Centers", In Journal of ACM Transactions on Computer Systems (TOCS), vol. 30 Issue 4, Nov. 1, 2012, 26 Pages.
Gong, et al., "Press: PRedictive Elastic ReSource Scaling For Cloud Systems", In Proceedings of International Conference on Network and Service Management, Oct. 25, 2010, pp. 9-16.
Gupta, et al., "Enforcing Performance Isolation Across Virtual Machines In Xen", In Proceedings Of International Conference on Distributed Systems Platforms and Open Distributed Processing, Nov. 27, 2006, 20 Pages.
Henri, Theil, "A Rank-Invariant Method Of Linear And Polynomial Regression Analysis", In Proceedings of Koninklijke Nederlandse Akademie van Wetenschappen, vol. 53, Retrieved on: Feb. 10, 2015, 18 pages.
Huber, et al., "Model-Based Self-Adaptive Resource Allocation In Virtualized Environments", In Proceedings of 6th International Symposium on Software Engineering for Adaptive and Self-Managing Systems, May 23, 2011,pp. 90-99.
Li, et al., "Robust Estimation Of Resource Consumption For SQL Queries Using Statistical Techniques", In Proceedings of VLDB Endowment, vol. 5, Issue 11, Jul. 1, 2012, pp. 1555-1566.
Lim, et al., "Automated Control For Elastic Storage", In Proceedings of the 7th International Conference on Autonomic Computing, Jun. 7, 2010, pp. 1-10.
Mozafari, et al., "Performance And Resource Modeling In Highly-Concurrent OLTP Workloads", In Proceedings of the ACM SIGMOD International Conference on Management of Data, Jun. 22, 2013, pp. 301-312.
Nguyen, et al., "AGILE: Elastic Distributed Resource Scaling For Infrastructure-As-A-Service", In Proceedings of 10th International Conference on Autonomic Computing, vol. 13, Jun. 26, 2013, pp. 69-82.
Padala, et al., "Automated Control Of Multiple Virtualized Resources", In Proceedings of 4th ACM European Conference on Computer Systems, Apr. 1, 2009, pp. 13-26.
"International Search Report and Written Opinion Issued in PCT Application No. PCT/US2016/026289", dated Jul. 13, 2016, 12 Pages.(MS#356733-WO-PCT ).
Rousseeuw, et al., "Robust Regression And Outlier Detection", In John Wiley & Sons, Inc., 1987, 347 Pages.
Roy, et al., "Efficient Autoscaling In The Cloud Using Predictive Models For Workload Forecasting", In Proceedings of IEEE 4th International Conference on Cloud Computing, Jul. 4, 2011, 8 Pages.
Sakr, et al., "Is Your Cloud-Hosted Database Truly Elastic?", In Proceedings of IEEE Ninth World Congress on Services, Jun. 1, 2013, pp. 444-447.
Shen, et al., "CloudScale: Elastic Resource Scaling For Multi-Tenant Cloud Systems", In Proceedings of the 2nd ACM Symposium on Cloud Computing, Oct. 26, 2011, 14 pages.

(56) References Cited

OTHER PUBLICATIONS

Shivam, et al., "Automated And On-Demand Provisioning Of Virtual Machines For Database Applications", In Proceedings of ACM SIGMOD International Conference on Management of Data, Jun. 11, 2007, pp. 1079-1081.

Soror, et al., "Automatic Virtual Machine Configuration For Database Workloads", In Proceedings of the ACM SIGMOD International Conference on Management of Data, Jun. 9, 2008, pp. 953-966.

Spearman, Charles, "The Proof And Measurement Of Association Between Two Things", In American Journal of Psychology, vol. 15, Issue 1, Jan. 1, 1904, pp. 72-101.

Storm, et al., "Adaptive Self-Tuning Memory In DB2", In Proceedings of the 32nd International Conference on Very Large Data Bases, Sep. 1, 2006, pp. 1081-1092.

Tanenbaum, et al., "Computer Networks", http://iips.icci.edu.iq/images/exam/Computer-Networks---A-Tanenbaum--5th-edition.pdf, Sep. 27, 2010, 962 Pages.

Trushkowsky, et al., "The SCADS Director: Scaling A Distributed Storage System Under Stringent Performance Requirements", In Proceedings of 9th USENIX Conference on File and Storage Technologies, Feb. 15, 2011, 14 Pages.

Waldspurger, et al., "Lottery Scheduling: Flexible Proportional Share Resource Management", In Proceedings of the 1st USENIX Conference on Operating Systems Design and Implementation, Article, Nov. 14, 1994, pp. 181-194.

Zhao, et al., "An Architecture Framework For Application-Managed Scaling Of Cloud-Hosted Relational Databases", In Proceedings of WICSA/ECSA Companion Volume, Aug. 20, 2012, 8 pages.

"Final Office Action Issued in U.S. Appl. No. 14/702,644", dated Dec. 3, 2018, 18 Pages. (MS# 356733-US-NP).

"Notice of Allowance Issued in U.S. Appl. No. 14/702,644", dated Mar. 26, 2019, 16 Pages. (MS# 356733-US-NP).

Mao, et al., "Cloud Auto-scaling with Deadline and Budget Constraints", In Proceedings of 11th IEEE/ACM International Conference on Grid Computing, Oct. 25, 2010, pp. 41-48.

\* cited by examiner

ISOLATING RESOURCES AND PERFORMANCE IN A DATABASE MANAGEMENT SYSTEM

RELATED APPLICATIONS

This application claims priority to and is a continuation of U.S. patent application Ser. No. 13/747,686, filed on Jan. 23, 2013, the entire contents of which are incorporated herein by reference.

BACKGROUND

Cloud computing delivers resources as a service to customers over a network, such as the Internet. For example, a database service (DaaS) (e.g., Microsoft® Windows Azure SQL Database™)) may offer database functionalities via a cloud computing environment to allow customers to make relational queries against stored data.

To reduce costs, a database service provider may share resources of a database server among multiple customers (e.g., enterprises or different applications within an enterprise). While reducing costs, this resource sharing may adversely affect the performance of the database and/or a customer's overall experience. For example, customers of a DaaS platform may execute arbitrary Structured Query Language (SQL) queries. These queries may be complex, and require substantial and varied resources of the database server. As a result, the performance of the database server with respect to a customer may vary significantly due to workloads concurrently issued by other co-located customers.

In sum, resource sharing with respect to a database service may cause performance unpredictability, which may result in a negative customer experience for those users that attempt to access data via the database service.

SUMMARY

Described herein are techniques for isolating user's performance from other co-located users' in a multiple-tenant Database Management System (DBMS). The techniques may provide a reservation of resources of a server to a user in a database server process. The reservation may include at least an amount of the resources of the server. The server may also meter the reservation promise to establish accountability for the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed, in part, to tenant performance isolation in a multiple-tenant DBMS. Embodiments of the present disclosure provide to a tenant a reservation of one or more resources of a database service and meter the promised reservation.

In accordance with the embodiments, a database server operates a database server process that hosts databases of multiple tenants within a DBMS. In the database server process, the database service may promise a reservation of one or more server resources to a tenant of the multiple tenants. The one or more server resources may include a central processing unit (CPU), memory, and an Input/Output (I/O) throughput, network bandwidth, data/instruction cache, and other resources of the database server.

After the reservation is promised, the database service may meter the reservation to verify whether the reservation for the tenant is met. In some embodiments, the database service may meter the reservation based on a metering algorithm specific to an individual resource of the one or more server resources. In some embodiments, the metering reservation may be independent from an implementation of the reservation. In response to determining that the tenant fails to receive the server resources, the database service may establish accountability of the DBMS service provider to the tenant.

Existing techniques for resource management in a traditional enterprise DBMS may not be adequate for assurances of tenant performance at a resource-level (e.g., a CPU, memory and an I/O throughput of a database server). For example, some techniques include assigning relative priorities, enabling proportional sharing, or enforcing maximum limits on resource usages. However, particularly in standard cloud computing, a major drawback of relative priorities and proportional sharing is that the assurance of how much resources a tenant will receive is not absolute. In fact, the assurance depends on which other tenants are active and priorities/shares associated with the other tenants.

Similarly, enforcing maximum limits also suffers from this drawback when the service provider overbooks (i.e., promises more resources in aggregate to tenants than the available system capacity) to increase utilization and cost-effectiveness. However, embodiments of the present disclosure provide the assurance of how much resources the tenant will receive, wherein the assurance is not dependent on other tenant's workloads of the DBMS.

Illustrative Environment

Figure 1:
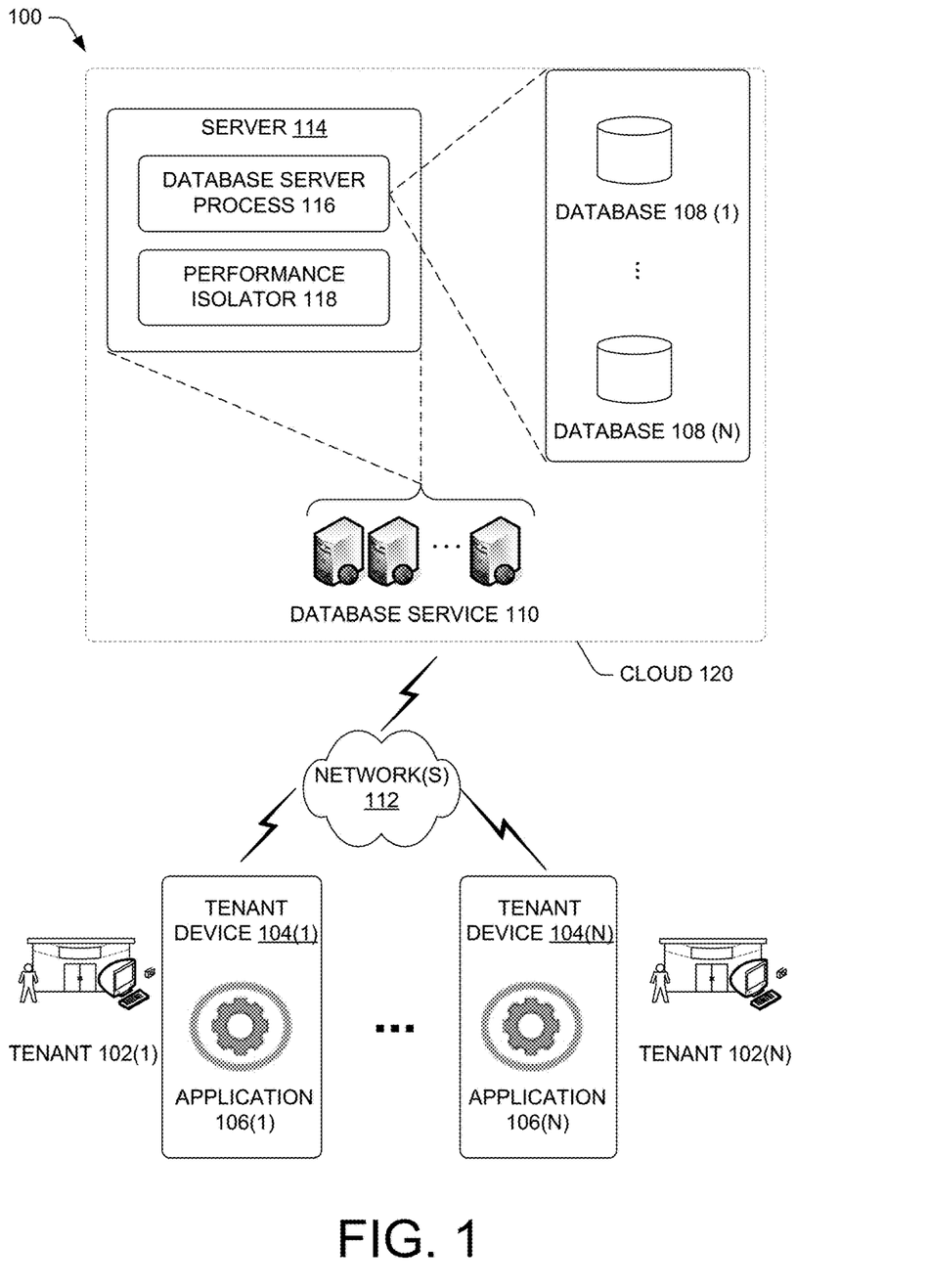
FIG. 1 illustrates an example computing environment that includes a database service for performance isolation in a multiple-tenant DBMS.

FIG. 1 illustrates an example computing environment 100 in which a tenant's performance is isolated from other tenants in a multiple-tenant DBMS. A database service provider promises a reservation of certain resources of a server within a database server process. The resource reservation is accompanied by an independent metering process that provides accountability to tenants. If a tenant is not allocated resources based on the promise, the metering process decides whether the tenant's workload does not have sufficient demand to consume the resources promised or whether the database service fails to allocate sufficient resources. If the service fails to allocate sufficient resources, the database service provider is held accountable and corresponding resource deficiencies may be compensated.

In the illustrated embodiment, the techniques are described in the context of tenant 102(1), . . . (N), via tenant devices 104(1), . . . (N), operating applications 106(1), . . . (N). The applications 106(1), . . . (N) access databases 108(1), . . . (N) of a database service 110 over a network 112. For example, the tenant 102(1) may use the tenant device 104(1) to operate application 106(1) to query and/or update the database 108(1) running on a server 114 (e.g., a database server). In some embodiments, the tenant 102(1) may be a customer associated with a certain identifier (ID) that is mapped to certain queries and/or updates associated with one or more databases. For example, the tenant 102(1) may be a user, a certain user group, and/or an organization that has an ID mapping to one or more database operated by the database service 110.

In the computing environment 100, the database service 110 (e.g., Microsoft® Windows Azure SQL Database™) may offer database as a service (DaaS) functionalities in a cloud computing system (i.e., a cloud 120). In some instances, the database service 110 may offer rational database functionalities that are designed to be a multiple-tenant DaaS in which a database server process hosts databases of different tenants. In some embodiments, multiple-tenancy in DaaS may be associated with on-premise clouds where databases of multiple independent applications within an enterprise are consolidated in a DBMS server.

Here, the tenant 102(1) accesses the database 108(1) via network 112. Network 112 may include any one or combination of multiple different types of networks, such as cable networks, the Internet, and wireless networks. The tenant devices 104(1)-(N), meanwhile, may be implemented as any number of computing devices, including as a personal computer, a laptop computer, a portable digital assistant (PDA), a mobile phone, a set-top box, a game console, a personal media player (PMP), and so forth. The tenant device 104(1) is equipped with one or more processors and memory to store applications and data. The applications 106(1)-(N) running on the tenant devices 104(1)-(N) may facilitate access to the database service 110 over the network 112.

In the illustrated embodiment, the database service 110 may include a server 114 configured to have database functionalities, such as database storage and retrieval. In some embodiments, the server 114 may hold a database management system (DBMS) and/or one or more databases mapping to the tenants 102(1)-(N). For example, the server 114 may operate a database server process 116 that hosts the databases 108(1)-(N) corresponding to the tenants (1)-(N) and effectively enables sharing resources of the server 114 among the tenants 102(1)-(N). In some instances, each of the tenants 102(1)-(N) may access a corresponding database of the databases 108(1)-(N).

The server 114 may also include a performance isolator 118 configured to provide and meter resource reservations. The resource may include a central processing unit (CPU), memory, an I/O throughput, network bandwidth, data/instruction cache, and other resources of the server 114. For example, the performance isolator 118 may provide a reservation of server resources to the tenant 102(1). Also, to make the reservation auditable, the performance isolator 118 may determine that the reservation promise is violated and/or the violation occurred because the database service fails to allocate the resource to the tenant 102(1). In some embodiments, the performance isolator 118 may determine that the reservation promise is violated and/or the violation occurred because the tenant 102(1)'s workload has less demand for the resources that were reserved. The resource reservations and metering the resource reservations are discussed in greater detail in FIGS. 2, 3 and 5.

Illustrative Architecture

Figure 2:
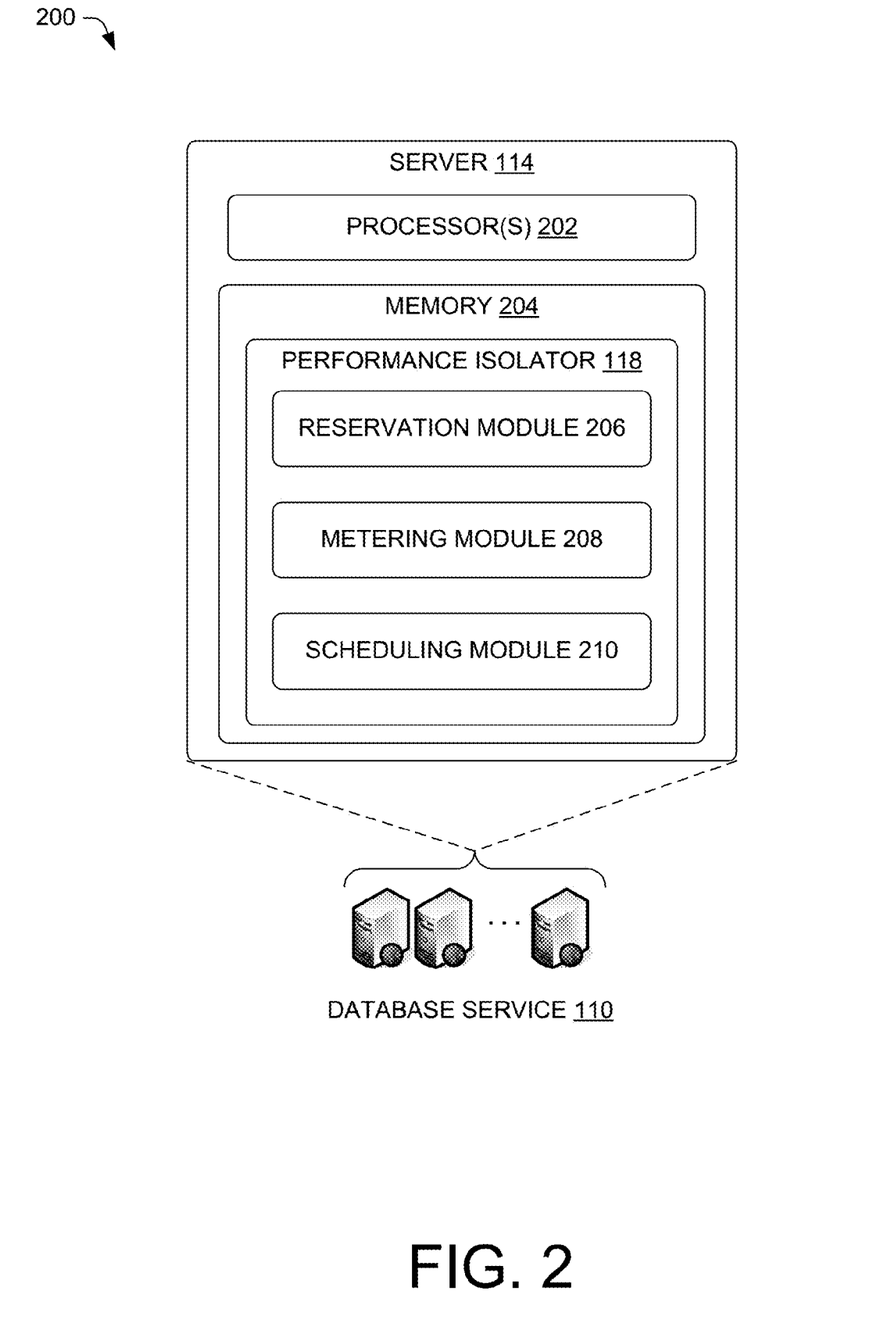
FIG. 2 illustrates an example architecture of a server for performance isolation in a multiple-tenant DBMS.

FIG. 2 illustrates an example architecture 200 of the server 114 for performance isolation in a multiple-tenant DBMS. The architecture may include processor(s) 202 and computer-readable media 204. The computer-readable media 204 may store various modules, applications, programs, or other data. The computer-readable media 204 may include instructions that, when executed by the processor(s) 202, cause the processors to perform the operations described herein for the server 114. In some embodiments, the computer-readable media 204 may store the performance isolator 118, which may include a reservation module 206, a metering module 208 and a scheduling module 210 that facilitates the performance isolation associated with the server 114.

The reservation module 206 may provide a reservation of one or more resources for the tenant 102(1) in a database server process hosted by the server 110. In some embodiments, the reservation module 206 may promise a reservation of server resources to the tenant 102(1) to assure how much resources the tenant 102(1) will receive. In these instances, the reservation is independent from other tenants. For example, suppose that the tenant 102(1) is promised a reservation of 100 I/Os per second (IOPS). As a result, if the tenant 102(1)'s workload demands 100 IOPS (or more), the system may assume responsibility for granting 100 IOPS no matter which other tenants are executing concurrently on the server.

In some embodiments, the resource reservations may be implemented without allocating a fixed amount of server resources to an individual tenant. In these instances, the tenant 102(1) may not receive the resources as promised, for example, due to overbooking. Therefore, metering the promise may be performed to establish accountability.

In the illustrated embodiment, the performance isolator 118 may have the metering module 208 configured to meter the promise of the reservation to isolate a performance of the tenant 102(1) from other tenants that are served by the database service 110. In some embodiments, the metering module 208 may perform metering using a metering interval (i.e., a window of time over which this metering is done). For example, if the metering interval is 1 second, then the promised reservation is assured to be met every second. In some embodiments, the metering module 208 may meter the promise of the reservation of individual server resources using a particular algorithm.

When the tenant 102(1) is not allocated resources according to the promise, the metering module 208 may decide whether the tenant's workload does not have sufficient demand to consume the resources promised or whether the database service 110 fails to allocate sufficient resources. Accordingly, the metering module 208 may maintain being fair to both the tenants 102(1)-(N) and the database service 110 even when resource requests arrive in bursts.

Referring to the I/O example above, suppose that the tenant 102(1)'s workload actually achieves 80 IOPS when the reservation is 100 IOPS. There may be at least two reasons why this may happen: (a) the tenant 102(1)'s queries do not generate sufficient I/O requests; (b) the tenant 102(1)

generates sufficient I/O requests, but the database service allocates IOPS to other tenants instead, thereby depriving the tenant 102(1) of some of the resource as promised. In some instances, the metering is independent of the actual resource allocation mechanisms to provide performance assurances in a multiple-tenant DBMS.

In some embodiments, a SQL virtual machine (SQLVM) may be generated by reserving multiple server resources of the server 114 for the tenant 102(1). In these instances, the tenant 102(1) is exposed the SQLVM with a specified set of resources such as CPU, I/O throughput, and memory associated with the server 114. Inside of the SQLVM, promise-aware resource allocation mechanisms may exercise fine-grained control to meter shared resources across the tenants 102(1)-(N). In some embodiments, the fine-grained control may be performed without having to allocate a fixed amount of the resources for the tenant 102(1). If one tenant's resource reservation is not met, the metering module 208 may establish accountability for that resource.

In a multi-tenant system, the server 114 consumes resources not only for the tenants' tasks but also for system tasks necessary to achieve other properties such as high availability (e.g., via replication to other machines), check-pointing to reduce recovery time, and backup/restore. In some embodiments, SQLVM may isolate the tenant 102(1)'s resource reservation from the database service 110's management activities. In some instances, these management activities may also be governed via the SQLVM by logically treating the database service 110 as an "internal tenant" with certain resource requirements. In the cloud 120, a SQLVM may be mapped to a logical server, thus making the promise independent of the actual capacity of the physical server hosting the tenant.

Figure 3:
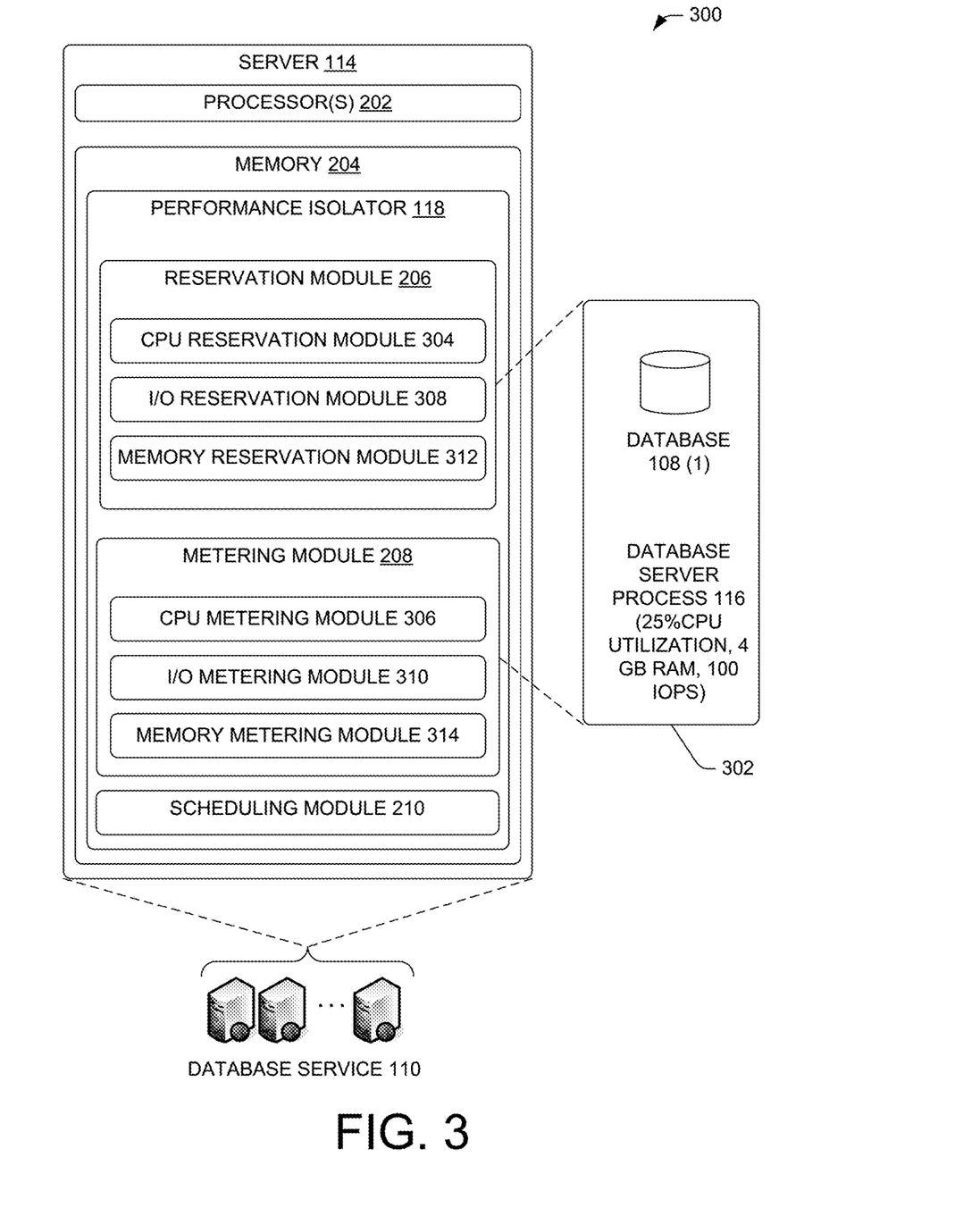
FIG. 3 illustrates another example architecture of a server for performance isolation in a multiple-tenant DBMS.

FIG. 3 illustrates another example architecture 300 of the server 114 for performance isolation in a multiple-tenant database management system. In the illustrated embodiment, the server 114 may promise to reserve certain DBMS resources including CPU, I/O throughput, memory (e.g., buffer pool and working memory) and meter the reservation. For example, the server 114 may promise a reservation 302 that, in the database server process 116, reserves a 25% CPU utilization, 4 GB working memory, and 100 I/O per second for the tenant 102(1) to query and/or update the database 108(1). Reservation and metering of CPU, memory and I/Os is discussed in greater detail below respectively.

Illustrative CPU Reservation and Metering

In some embodiments, the database server process 110 may run on a processor with multiple cores. For example, on a machine with two quad-core processors, the server 114 may run up to 8 tasks (i.e., threads) concurrently, or more if for example there is hyper-threading. On each core, the scheduling module 210 decides which among the tasks queued on that core gets to run next. A task may be in one of the following states: running, runnable, or blocked. For example, the task may be in a state of running if the task is currently executed on the core. The task may in be a state of runnable if the task is ready to be executed. The task may be in a state of blocked if the task is waiting on other resources and, hence, is not ready to be executed.

For a tenant, and a given core, a CPU utilization over an interval of time may be defined as a percentage of time for which a task of that tenant is running on that core. Accordingly, in a case of k cores as the total time for which tasks of that tenant run across all cores, the CPU utilization is a percentage of a value of k multiplied by a time interval (e.g., a metering interval).

In the illustrated embodiment, the reservation module 206 may include a CPU reservation module 304 configured to provide, for the tenant 102(1), a reservation of a certain CPU utilization, herein referred as ResCPU. Accordingly, a slice of the CPU time on available core(s) is promised to the tenant 102(1). In some embodiments, the promised CPU time may be reserved among multiple cores for the tenant 102(1). This may allow better consolidation of CPU utilizations for multiple tenants since the CPU reservation module 304 may promise CPU utilizations to a number of tenants that is greater than the available cores. For example, on a single core server, if ResCPU=10% in a metering interval of 1 sec, the tenant 102(1) should be allocated a CPU time of at least 100 Microsecond (msec) unless the tenant 102(1) does not have sufficient a workload. For example, the tenant 102(1) may have sufficient a workload when at least one task of the tenant 102(1) utilizes the CPU during the metering interval.

Also, the metering module 208 may include a CPU metering module 306 configured to meter a CPU reservation of the tenant 102(1) on a core of the server 114. In some embodiments, a task of the tenant 102(1) may utilize the CPU if the tenant 102(1) has at least one task that is running or is runnable on the server 114. In these instances, the CPU metering module 306 may determine whether the tenant 102(1) receives at least ResCPU percentage of the CPU in the total time during which at least one task utilizes the CPU).

For example, if the tenant 102(1) was promised ResCPU=10% and if the tenant 102(1) had at least one task ready to run (or running) for 500 ms, the provider violates the promise only if the allocated CPU is less than 50 ms. In other words, the tenant 102(1)'s effective utilization is less than 10%. This notion of metering is fair since the provider is not held accountable for the tenant 102(1) being idle (i.e., no tasks ready to run), while ensuring that the database service 110 cannot arbitrarily delay a tenant's task without violating the promise.

Illustrative I/O Reservation and Metering

Achieving adequate I/O throughput (IOPS) and/or I/O bandwidth (bytes/sec) is important for many database workloads. As in the case of CPU, statically dedicating a disk (or set of disks) per tenant to achieve acceptable I/O throughput may limit the amount of consolidation. Thus, fine-grained sharing of the IOPS available from a disk may be beneficial. While the discussion below focus on I/O throughput, techniques disclosed in the discussion may be applied to I/O bandwidth as well.

In the illustrated embodiment, the reservation module 206 may include an I/O reservation module 308 configured to provide a reservation for the tenant 102(1) a certain IOPS, herein referred as ResIOPS. This reservation may be a slice of the IOPS capacity available of the underlying physical disk drives. In some instances, sequential and random I/Os may be treated in a similar manner. The rationale is that even though DBMSs traditionally have developed optimizations for sequential I/O, the stream of I/O requests in a server hosting independent tenant workloads may not be sequential due to the high degree of multiplexing across tenant workloads. However, for tenants whose workloads require scanning large amounts of data (e.g., decision support workloads), the promise may be offered in terms of I/O bandwidth.

Also, the metering module 208 may include an I/O metering module 310 configured to meter I/O throughput to determine whether the tenant 102(1) has sufficient I/O requests to meet the reserved resources and whether the I/O throughput achieved is commensurate with the promise. If the tenant 102(1) has at least one I/O request pending, then the tenant 102(1) may be deemed to have work to utilize the I/O resources. In some instances, the effective I/O throughput may be defined as the IOPS achieved for the time when the tenant 102(1) had at least one pending I/O request in the given metering interval. The I/O metering module may determine a violation if the effective I/O throughput is less than ResIOPS. The rationale is that if requests arrive in bursts, the provider should issue enough I/O requests to meet the effective rate of ResIOPS, thus preventing the provider from unnecessarily delaying the requests. However, the service is not held accountable for periods when the tenant 102(1) was idle, i.e., having no pending I/O request.

Illustrative Memory Reservation and Metering

In a RDBMS, uses of memory may include buffer pool and working memory. The buffer pool is a cache of database pages that is managed using a page replacement strategy (e.g., LRU-k). If a page is not found in the buffer pool, the DBMS incurs I/O to obtain it from secondary storage. Working memory is private to a physical operator used in a query execution plan, such as Hash or Sort. If working memory is limited, the operator may need to spill partitions of a hash table to secondary storage, thus again incurring additional I/O. Similar to static reservation of CPU and I/O capacity, statically allocating a tenant's memory may also limit consolidation of resource reservations for multiple tenants. Therefore, the techniques disclosed herein dynamically distribute memory across tenants, while providing a precise promise that exposes an illusion of statically-allocated memory.

In the illustrated embodiment, the reservation module 206 may also include a memory reservation module 312 configured to allow dynamic and fine-grained sharing of memory among tenants. The memory reservation module 312 may promise the tenant 102(1) a number of I/Os incurred in a multi-tenant system is the same as though the system had dedicated a certain amount (e.g., 1 GB) of buffer pool memory for the tenant. Similarly, promising a number of I/Os to the tenant 102(1) may also applicable for working memory reservation. In some embodiments, Relative 10 may be used to indicate whether the server 114 is responsible for providing additional I/O throughputs. For a given amount of memory M, the Relative 10 may be define as follows:

$$\text{Relative } IO = \frac{\text{Actual } IOs - \text{Baseline } IOs(M)}{\text{Baseline } IOs(M)}$$

The memory reservation module 312 promises the tenant 102(1) Relative IO≤0 for a given amount of memory. Similar to other resources, a tenant 102(1) is promised a memory reservation, herein referred as ResMem. For example, suppose the tenant 102(1) is promised a 1 GB buffer pool memory reservation. In effect, the promise is that the tenant's workload will see the same hit ratio as though a 1 GB buffer pool is reserved for the tenant. Similarly for working memory, for example, a promise of 500 MB implies that there would be no more I/O to/from disk for hash or sort operators in SQL query plans compared to 500 MB of working memory dedicated to that tenant.

Also, the metering module 208 may include a memory metering module 314 configured to meter memory allocation to a tenant. In some embodiments, memory is allocated dynamically and a tenant's actual memory allocation may differ from ResMem. Metering memory may include determining Baseline IOs (M) and measuring actual IOs. In some embodiments, for both buffer pool memory and working memory, the baseline simulation is feasible and accurate.

For example, for buffer pool memory, the relative I/O is dependent on the page access order, page replacement policy and page metadata (such as dirty bit), rather than the actual contents of the pages. The CPU overhead necessary to simulate this baseline buffer pool may be piggybacked on the actual buffer pool accesses and page replacement, and is almost negligible in some embodiments. In some instances, if the memory metering module 314 determines RelativeIO>0, any such additional I/Os incurred for the tenant 102(1) are not charged to the tenant 102(1)'s ResIOPS but to the database service 110.

Illustrative I/O Scheduling

In general, there are at least three challenges in implementing I/O scheduling in a DBMS for meeting ResIOPS promised to each tenant. The first challenge is the accuracy and efficiency of the actual scheduling mechanism. The second challenge concerns accurately accounting all I/O requests associated with the tenant 102(1) irrespective of whether an I/O request is directly issued during execution of a tenant's workload or issued by a background system activity on behalf of the tenant. The third challenge pertains to the fact that database systems often use multiple logical drives (e.g., volumes), e.g., one volume for storing data files and a separate volume for the log file, or data striped across multiple volumes. In some embodiments, an I/O scheduling mechanism described herein may handle these scenarios.

The tenant 102(1) may have multiple queries concurrently executing and issuing I/O requests. These queries may run on multiple cores of the server 114, and may issue I/O requests independently of other queries belonging to the tenant. Furthermore, in a multi-core processor, I/O requests of the tenant 102(1) are not guaranteed to be evenly balanced across cores. Thus, a challenge in meeting ResIOPS accurately across multiple cores and queries is to synchronize a tenant's I/O requests from different cores and from concurrent queries with a minimum reservation of server resources promised to the tenant 102(1).

Figure 4:
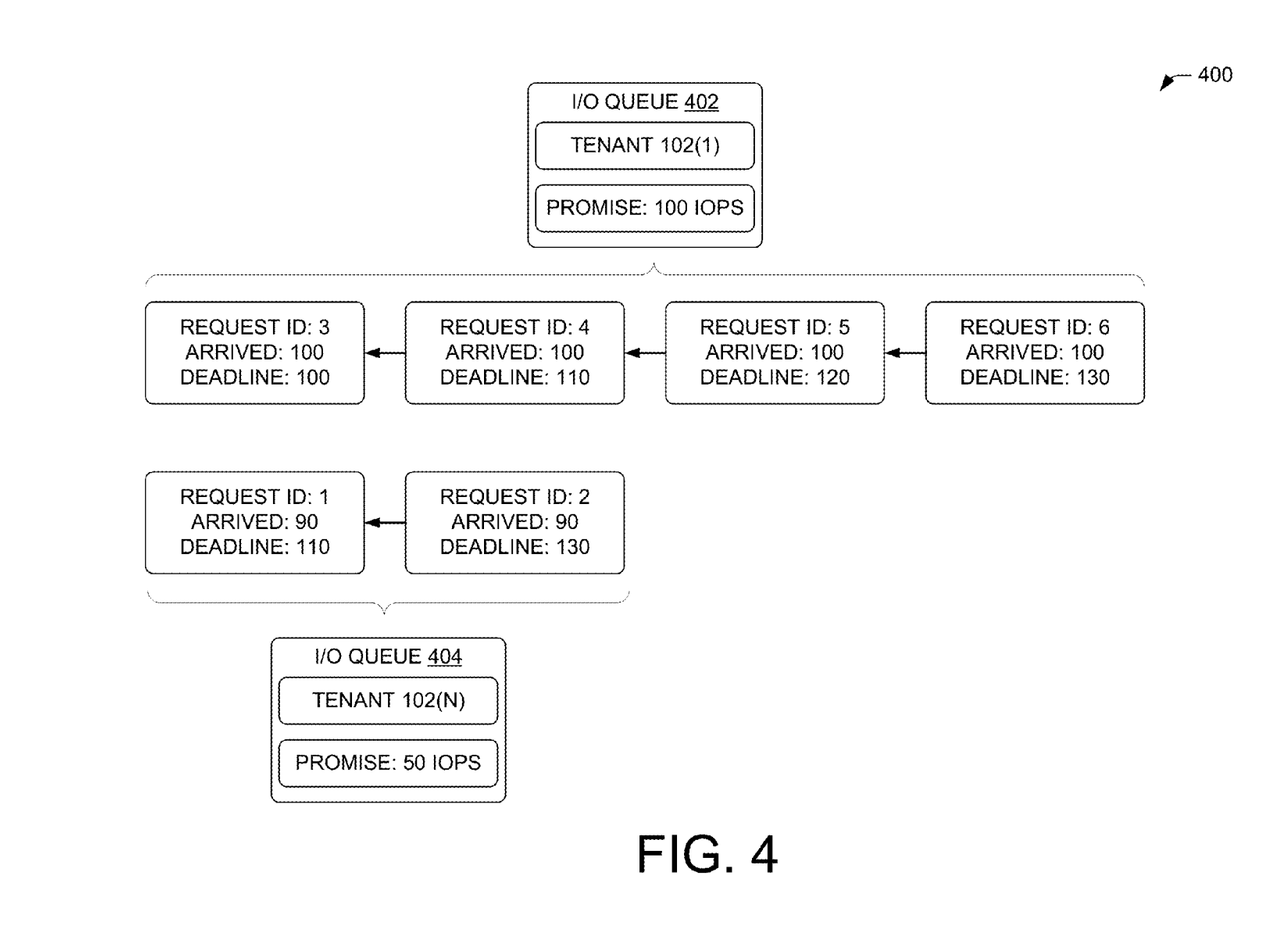
FIG. 4 illustrates an example scheme for issuing Input/Output requests.

FIG. 4 is a flow diagram of an illustrative scheme 400 for issuing I/O requests. The server 114 may maintain a queue of I/O requests per tenant on each core as part of a scheduler's data structures. The performance isolator 118 may include the scheduling module 210 configured to periodically check pending I/O requests whose deadline is before a particular time. The scheduling module 210 may check these pending I/O requests after a task yields a CPU of the server 114. When a tenant's workload issues an I/O request, the I/O request is assigned a deadline. The deadline may be a timestamp indicating the time at which the I/O request is issued to meet the ResIOPS promised to the tenant. Suppose that an IO request is issued every T ms, which may result in 1000/T IOPS.

For example, if the tenant 102(1) is promised 100 IOPS, then the system meets the promise by issuing one I/O of the tenant 102(1) every 10 msec. Thus, deadlines for I/O requests of a particular tenant may be spaced 1/ResIOPS second apart. This deadline assignment may require synchronization across cores in a multi-core processor. Thus, this mechanism is scalable in terms of number of cores and number of concurrent tenants, while providing accurate controls over I/O throughput. Once assigned a deadline, an I/O request is queued in a pending I/O queue to be issued by the scheduling module 210 at an opportune moment.

In the illustrated embodiment, the scheme 400 may include an I/O queue 402 and I/O queue 404, which are associated with the tenant 102(1) and the tenant 102(N) respectively. The server 114 provides a reservation of 100 IOPS for the tenant 102(1) and a reservation of 50 IOPS for the tenant 102(N). The I/O queue 402 and I/O queue 404 may include multiple I/O requests each having a request ID, a deadline and an arrival time of the I/O request. The scheduling module 210 may de-queue and issue an I/O request based on a comparison between a current time and a deadline associated the I/O request. For example, suppose a current time is 110 (i.e., now=110), the scheduling module 210 may de-queue and issue I/O requests of a request ID 1, request ID 3 and request ID 4.

In some embodiments, I/O requests for the tenant 102(1) are issued in the order of arrival times. Since I/O requests may potentially be reordered by the disk controller, the server 114 may reorder I/O requests of the tenant 102(1) in queues to achieve higher-level optimizations for tenant workloads. For example, consider the tenant 102(1) that has issued a short query (requiring only a few I/Os) concurrently with another long-running query (requiring a large number of I/Os) that has already queued a number of I/O requests. In this case, reordering the I/O requests issued by the queries of the tenant 102(1) may significantly reduce latency of the short query while still achieving the ResIOPS for the tenant. In addition to meeting ResIOPS, the above mechanism may shape a burst of I/O traffic of the tenant 102(1) by issuing these requests spaced apart over a period of time. Since a context switch on a scheduler may be frequent (e.g., several hundred times a second), a fine-grained control over I/O issuance may be implemented.

I/Os issued by a tenant's workload may conceptually be categorized as direct (i.e., issued during the execution of the workload), or indirect (i.e., issued by a system thread on behalf of the tenant 102(1) as part of a background activity). Examples of direct I/Os may be reads of data pages required for query execution, log writes, and reads and writes performed during a backup or restore database operation. Examples of indirect I/Os may include: flushing dirty data pages to the disk, check-pointing, and data replication for availability. Direct I/Os are readily accountable and may be directly associated with the tenant 102(1) that issued the I/O. Since indirect I/Os are issued from a system thread, additional information may be extracted from the context to identify which tenant the I/O should be accounted to.

A logical drive, or volume, is a collection of disk spindles (or an SSD) that is exposed to the OS as single device. A file on that drive is typically striped across all spindles of that drive. Moreover, DBMSs often use multiple volumes; a typical configuration might be to use one volume for the data file(s) of a database and one volume for the log file. In some embodiments, the performance isolator 118 may govern each such volume independently. Accordingly, an IOPS reservation for the tenant 102(1) internally maps to an IOPS reservation per volume. In implementing I/O scheduling, one logical queue of I/O requests per tenant per volume may be maintained.

A reservation of 100 IOPS may have two different interpretations, and therefore two different metering schemes. One version is that as long as the tenant 102(1) has at least one I/O request pending, the system will issue one I/O every 10 msec (i.e., 1/100 second). Such a promise might be attractive to applications striving for low latency in addition to low variability in I/O throughput. For this interpretation, the metering module 208 computes the delay between when the I/O should have been issued and when it is actually issued. The scheduling mechanism described above maintains a deadline for each I/O that identifies the time by when the I/O should be issued to achieve the desired ResIOPS. Thus, when an I/O request is actually issued, the metering logic uses the deadline to compute the delay, if any. At the end of the metering interval, a distribution of these delays is reported (e.g., maximum, average, percentiles) that quantifies the violation of the promise. If delay is 0 for every I/O request, then ResIOPS promise is met.

Another version promises that the average I/O throughput over the meeting interval is at least 100 IOPS. This interpretation relaxes the requirement to issue one I/O every (1/ResIOPS) second as long as the average rate for the interval meets the promised ResIOPS. Metering for the second version may also leverage the deadline. At the end of the interval, each I/O request whose deadline lies within the interval but is not issued represents a violation. If there are n such violations in a metering interval of t sec, then the promise is violated by n/t IOPS. Deadline assignment inherently factors out idle time and hence this metering logic is similar to that described in the section of Illustrative I/O Reservation and Metering.

Illustrative Operations

Figure 5:
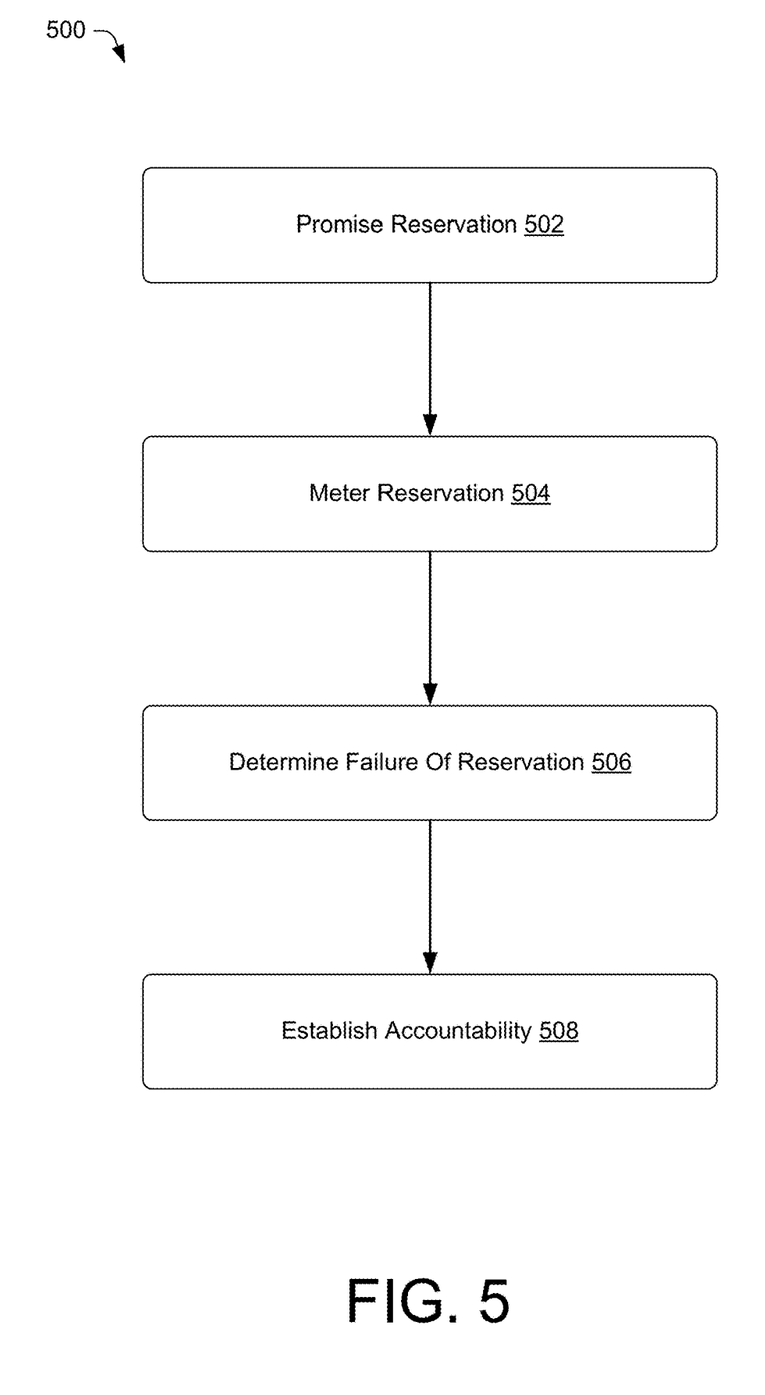
FIG. 5 illustrates an example process for isolating performance in a multiple-tenant DBMS.

FIG. 5 is a flow diagram of an illustrative process 500 for isolating performance in a multiple-tenant DBMS. The process 500 is illustrated as collections of blocks in logical flow graphs, which represent sequences of operations that may be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the process.

At 502, the server 114 may provide a reservation of one or more server resources for the tenant 102(1) in the database server process 116 that hosts multiple databases of the tenants 102(1)-(N). The one or more server resources may include a predetermined amount of CPU utilization, memory and I/O throughput of the server 114 operating the database server process 116. In some instances, the CPU utilization may specify a percentage of CPU time for which a task of the tenant 102(1) runs on a core of the CPU of the server 114. The reservation of the I/O throughput may include a predetermined I/O throughput amount of an IOPS capacity of the server 114. The reservation of memory may include at least one of a buffer pool and working memory of the server 114. In some embodiments, the server 114 may also enforce a maximum limit on resource usages of the one or more server resources for the tenant 102(1). In these instances, a difference between an amount of actual resource usages and the amount of resource reservation (e.g., the predetermined amount of CPU utilization) may be determined based on a predetermined relative priority associated with the tenant 102(1).

At 504, the server 114 may meter the reservation to assure a performance isolation of the tenant 102(1) from other tenants (e.g., the tenant 102(N)). In some embodiments, the server 114 may meter the reservation based on a metering algorithm that is unique or specific to an individual resource of the one or more server resources. In some embodiments, the metering reservation may be independent from an implementation of the reservation. At 506, the server 114 may determine that the tenant 102(1) fails to receive a predetermined amount of a promised server resource, and may establish, at 508, accountability in response to the determination.

In some embodiments, the predetermined amount of the server resource includes a predetermined amount of I/O throughput in a metering interval. The server 114 may establish an accountability of the server 114 after determining that an effective I/O throughput associated with a pending I/O request of the tenant 102(1) is less than the predetermined amount of I/O throughput.

In some embodiments, the predetermined amount of the server resource includes a percentage of CPU time for which a task of the tenant, in a metering interval, runs on a core of a CPU of the server 114. The server 114 may establish an accountability of the server 114 based on whether a workload of the tenant 102(1) has a sufficient demand to consume the percentage of CPU time in the metering interview and whether the server fails to allocate the percentage of CPU time in the metering interval.

Illustrative Computing Device

Figure 6:
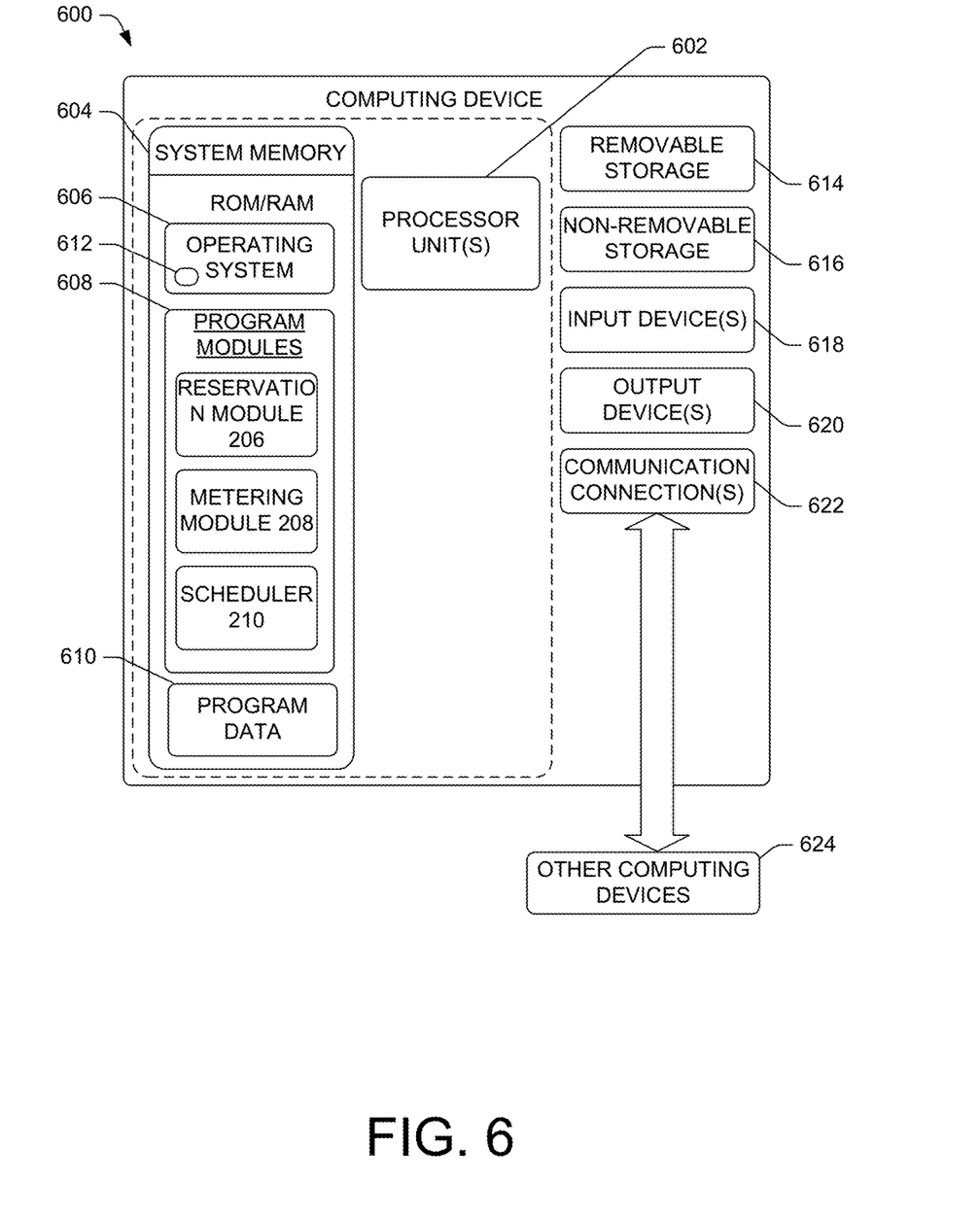
FIG. 6 illustrates an example computing device that may be deployed in the environment shown in FIG. 1 and the architectures shown in FIGS. 2 and 3.

FIG. 6 shows an illustrative computing device 600 that may be used to implement tenant performance isolation, as described herein. The various embodiments described above may be implemented in other computing devices, systems, and environments. The computing device 600 shown in FIG. 6 is only one example of a computing device and is not intended to suggest any limitation as to the scope of use or functionality of the computer and network architectures. The computing device 600 is not intended to be interpreted as having any dependency or requirement relating to any one or combination of components illustrated in the example computing device.

Alternatively, or in addition, the functionally described herein may be performed, at least in part, by one or more hardware logic components. For example, and without limitation, illustrative types of hardware logic components that may be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In a very basic configuration, the computing device 600 typically includes at least one processing unit 602 and system memory 604. Depending on the exact configuration and type of computing device, the system memory 604 may be volatile (such as RAM), non-volatile (such as ROM, flash memory, etc.) or some combination of the two. The system memory 604 typically includes an operating system 606, one or more program modules 608, and may include program data 610. For example, the program modules 608 may includes the reservation module 206, the metering module 208 and the scheduling module 210, as discussed in the computing environment 100 and architectures 200 and 300, and/or the illustrative process 500.

The operating system 606 includes a component-based framework 612 that supports components (including properties and events), objects, inheritance, polymorphism, reflection, and the operating system 606 may provide an object-oriented component-based application programming interface (API). Again, a terminal may have fewer components but will interact with a computing device that may have such a basic configuration.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 614 and non-removable storage 616. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 604, the removable storage 614 and the non-removable storage 616 are all examples of computer storage media. Computer storage media includes RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that may be used to store the desired information and which may be accessed by the computing device 600. Any such computer storage media may be part of the computing device 600. Moreover, the computer-readable media may include computer-executable instructions that, when executed by the processor unit(s) 602, cause the computing device 600 to perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 600 may also have input device(s) 618 such as keyboard, mouse, pen, voice input device, touch input device, etc. In some embodiments, input methods may be implemented via Natural User Interface (NUI). NUI may include any interface technology that enables a user to interact with a device in a "natural" manner, free from artificial constraints imposed by input devices such as mice, keyboards, remote controls, and the like. Examples of NUI methods may include those relying on speech recognition, touch and stylus recognition, gesture recognition both on screen and adjacent to the screen, air gestures, head and eye tracking, voice and speech, vision, touch, gestures, and machine intelligence. Categories of NUI technologies may include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Output device(s) 620 such as a display, speakers, printer, etc. may also be included. These devices are well known in the art and are not discussed at length here.

The computing device 600 may also contain communication connections 622 that allow the device to communicate with other computing devices 624, such as over a network. These networks may include wired networks as well as wireless networks. The communication connections 622 are one example of communication media.

It is appreciated that the illustrated computing device 600 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 600 may be implemented in a cloud computing environment, such that resources and/or services are made available via a computer network for selective use by mobile devices.

Conclusion

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A computing device configured to determine whether a tenant is actually allocated a previously reserved allocation of server resources, the computing device comprising:
   one or more processors; and
   one or more computer-readable storage devices storing instructions that, when executed by the one or more processors, cause the computing device to:
   determine a reserved allocation of a server resource for a tenant in a multi-tenant environment, the reserved allocation including a reserved amount of the server resource in a database server process to allocate for the tenant, the reserved allocation of a server resource including at least a minimum guaranteed central processing unit (CPU) utilization allocation, a minimum guaranteed amount of working memory, and a minimum guaranteed amount of input/output (I/O) throughput;
   receive, from the tenant, a request to utilize the server resource;
   determine, based at least in part on the request, a workload for the tenant;
   determine that the workload of the tenant has a sufficient demand to consume the guaranteed CPU utilization;
   meter an actual allocation of an actual amount of the server resource for the tenant; and
   determine, based at least in part on metering the actual allocation, including the CPU utilization, the minimum guaranteed amount of working memory, and the minimum guaranteed amount of I/O throughput, whether the tenant is actually allocated the reserved amount of the server resource.

2. The computing device of claim 1, wherein the instructions, when executed by the one or more processors, further cause the computing device to:
   determine that a workload for the tenant includes sufficient demand to consume the amount of the server resource;
   determine that the tenant is not allocated the amount of the server resource; and
   based at least in part on determining that the tenant is not allocated the amount of the server resource, establish an accountability of a server associated with the database server resource.

3. The computing device of claim 1, wherein the server resource includes at least one of, network bandwidth, or a data/instruction cache of a server associated with the database server process.

4. The computing device of claim 1, wherein metering the allocation comprises metering the allocation of the amount of the server resource based, at least in part, on a metering algorithm that is associated with the server resource.

5. The computing device of claim 1, wherein metering the allocation comprises metering the allocation of the server resource based at least in part on a time interval, and wherein the instructions, when executed by the one or more processors, further cause the computing device to:
   determine that the tenant is not allocated the amount of the server resource during the time interval.

6. The computing device of claim 1, wherein the instructions, when executed by the one or more processors, further cause the computing device to:
   determine that the server fails to allocate the amount of the CPU utilization to the tenant.

7. The computing device of claim 1, the amount of the server resource comprising an amount of I/O throughput associated with a server during a metering interval, and the request including a pending I/O request, and wherein the instructions, when executed by the one or more processors, further cause the computing device to:
   determine that an I/O throughput associated with the pending I/O request of the tenant is less than the amount of the I/O throughput; and
   determining that the tenant is not allocated the amount of the server resource.

8. A computer-implemented method for determining whether a tenant is allocated a reserved amount of server resources comprising:
   providing a reservation of a reserved amount of a server resource for a tenant in a multi-tenant environment, the server resource including each of a central processing unit (CPU) utilization allocation, a minimum guaranteed amount of working memory, a minimum guaranteed amount of input/output (I/O) throughput, a minimum network bandwidth;
   receiving, from the tenant, a request to utilize the server resource;
   determining, based at least in part on the request, that the tenant has sufficient demand to consume the reserved amount of the server resource;
   determining an actual amount of the server resource actually allocated to the tenant while servicing the request to utilize the server resource;
   comparing the actual amount and the reserved amount of the server resource; and
   determining that the tenant is not allocated the reserved amount of the server resource.

9. The computer-implemented method of claim 8, further comprising:
   metering, based at least in part on the request, the reservation of the server resource,
   and wherein determining that the tenant is not allocated the amount of the server resource is based, at least in part, on metering the reservation.

10. The computer-implemented method of claim 9, wherein metering the reservation of the server resource comprises metering the reservation of the server resource based, at least in part, on a metering algorithm that is associated with the server resource.

11. The computer-implemented method of claim 9, wherein:
   metering the reservation of the server resource comprises metering the reservation of the server resource based, at least in part, on a time interval; and
   determining that the tenant is not allocated the server resource comprises determining that the tenant is not allocated the server resource during the time interval.

12. The computer-implemented method of claim 8, further comprising establishing an accountability of the server for the tenant.

13. The computer-implemented method of claim 8, wherein the computer-implemented method further comprises:
   determining, based at least in part on the request, that the tenant has a running task or a runnable task on the core of the server,
   and wherein determining that the tenant is not allocated the amount of the server resource comprises determining that the server fails to provide the tenant with the guaranteed allocation of CPU utilization.

14. The computer-implemented method of claim 1, the reservation of the amount of the server resource including a resource reservation of an amount of I/O throughput of an I/O throughput capacity of the server, and wherein the computer-implemented method further comprises:
   determining, based at least in part on the request, that the tenant has a pending I/O request,
   and wherein determining that the tenant is not allocated the amount of the server resource comprises determining that an I/O throughput associated with the pending I/O request of the tenant is less than the amount of the I/O throughput of the resource reservation.

15. The computer-implemented method of claim 1, wherein the reservation of the amount of the server resource includes a resource reservation of an amount of at least one of a buffer pool or a working memory of the server.

16. A device configured to determine whether a tenant is allocated a reserved amount of server resources and provide for accountability of the server, the device comprising:
   one or more processors; and
      one or more computer-readable media storing instructions that, when executed by
      the one or more processors, cause the computing device to:
   provide a reservation of a reserved amount of a server resource to a tenant, the reserved amount of a server resource including at least a minimum guaranteed central processing unit (CPU) utilization allocation, a minimum guaranteed amount of working memory, and a minimum guaranteed amount of input/output (I/O) throughput;
   receive a request to utilize the server resource;
   determine, based at least in part on the request, a workload for the tenant;
   determine that the workload of the tenant has a sufficient demand to consume the guaranteed CPU utilization;
   determine, based at least in part on receiving the request, that a server does not allocate the reserved amount of the server resource to the tenant; and
   establish an accountability of the server for the tenant.

17. The device of claim 16, wherein the server resource includes at least one of network bandwidth, or a data/instruction cache of the server.

18. The device of claim 16, wherein the instructions, when executed by the one or more processors, further cause the computing device to:
   meter the reservation of the amount of the server resources; and
   determine, based at least in part on metering the reservation, whether the server allocates the amount of the server resource to the client.

19. The device of claim 16, wherein the amount of the server resource comprises an amount of CPU time for which a task of the tenant runs on a core of a CPU of the server, and wherein the instructions, when executed by the one or more processors, further cause the device to:
   determine, based at least in part on the request, a workload for the tenant; and
   determine that the workload of the tenant has a sufficient demand to consume the amount of CPU time,
   and wherein determining that the server does not allocate the amount of the server resource to the client comprises determining that the server fails to allocate the amount of the CPU time to the tenant.

20. The device of claim 16, wherein the amount of the server resource comprises an amount of I/O throughput associated with the server during a metering interval, and wherein the instructions, when executed by the one or more processors, further cause the device to:
   determine, based at least in part on the request, that the tenant has a pending I/O request,
   and wherein determining that the server does not allocate the amount of the server resource to the client comprises determining that an I/O throughput associated with the pending I/O request of the tenant is less than the amount of the I/O throughput.

* * * * *